No. 644,442. Patented Feb. 27, 1900.
J. F. McELROY.
FRICTION ROLLER.
(Application filed Jan. 12, 1898.)
(No Model.)

Witnesses
Chas. B. Mitchell.
J. M. Erwin

Inventor
James F. McElroy
by Ward & Cameron
Attys.

THE NORRIS PETERS CO., PHOTO-LITHO., WASHINGTON, D. C.

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

FRICTION-ROLLER.

SPECIFICATION forming part of Letters Patent No. 644,442, dated February 27, 1900.

Application filed January 12, 1898. Serial No. 666,463. (No model.)

*To all whom it may concern:*

Be it known that I, JAMES F. McELROY, a citizen of the United States, residing at Albany, in the county of Albany and State of New York, have invented a new and useful Improvement in Friction-Rollers, of which the following is a specification.

My invention relates to improvements in devices for causing rotation by means of frictional contact; and the object of my invention is to provide a friction-roller adapted for use in connection with the drive-wheels of locomotives, cars, and other similar vehicles and so constructed and arranged that the noise attendant upon the use of friction-driven trucks or vehicles shall be reduced to a minimum. I attain this object by means of the mechanism illustrated in the accompanying drawings, in which—

Figure 1:
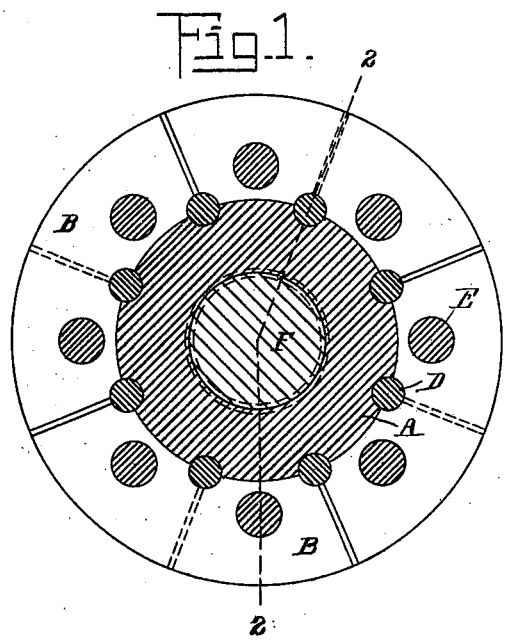
Figure 2:
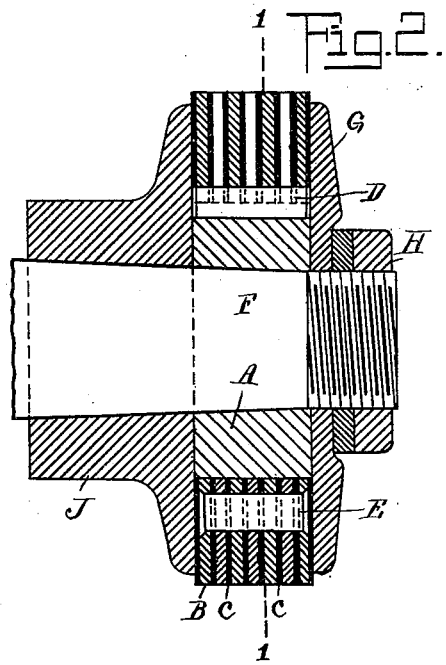
Figure 3:
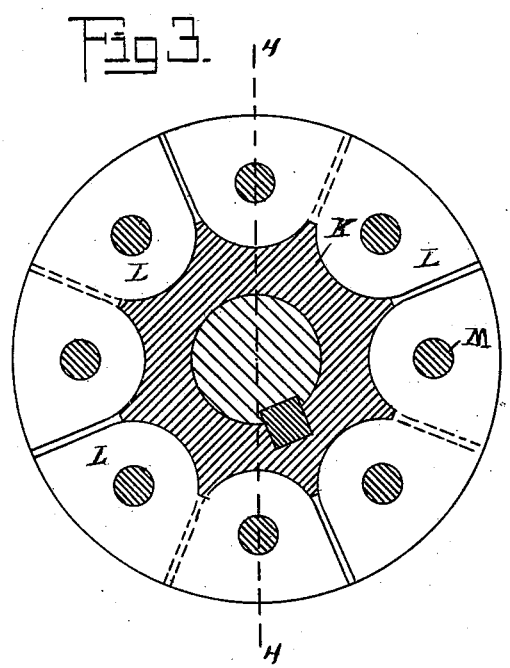

Figure 1 is a section along the lines 1 1 on Fig. 2. Fig. 2 is a section along the lines 2 2 on Fig. 1. Fig. 3 is a section along the lines 3 3 on Fig. 4, and Fig. 4 is a section along the lines 4 4 on Fig. 3.

Similar letters refer to similar parts throughout the several views.

For the purpose of constructing a roller in such a manner that it will be capable of yielding to the inequalities of the drive-wheels with which it comes in contact, and thus prevent the vibration occasioned by the irregular surface of one drive-wheel which comes in contact with one side of the roller from being communicated across the roller to the adjacent drive-wheel, which is also setting up vibrations, I construct the roller in such a manner and of such materials that it will be yielding, allowing the roller to assume an elliptical form, the resiliency extending from circumference to circumference rather than from center to circumference. To accomplish this result, I make the core A of the roller of paper or other yielding material, around which I place a series of layers B B, forming a tire so arranged that the circumference of the roller shall be made up of a series of tire-sections, the tire of the roller being composed of several layers of tire-sections B. The sections of each layer of the tire overlap the joints of adjacent layers. Between the layers of the tires I may place a cushioning substance C, or the layers may be placed in contact with each other. For the purpose of holding the tire-sections in contact with the core and preventing slipping I place a series of bolts D D, which preferably are placed at the joints of adjacent sections of the tire and which extend through the core and securely hold the tire-sections in position on the core. Through the tire-sections I preferably place a series of bolts E E, usually two through each tire-section, the bolts E holding the tire-sections securely together. The roller is mounted on the shaft F in any convenient manner, preferably by means of the casting J', the plate G, and the nut H, as shown in Figs. 2 and 4. As thus arranged the strain applied to the roller, and which strain is that which comes from the adjacent drive-wheels with which it is placed in contact, tends to force the opposite sides of the roller toward each other. This will force the various sections of the tire together, thus allowing for a slight giving or yielding of the roller. The compressible material forming the core A is also acted upon by the strain and allows for the spreading out or lengthening of the roller into an elliptical form, thus preventing the ready passage of the vibrations from one side of the roller to the other.

Figure 4:
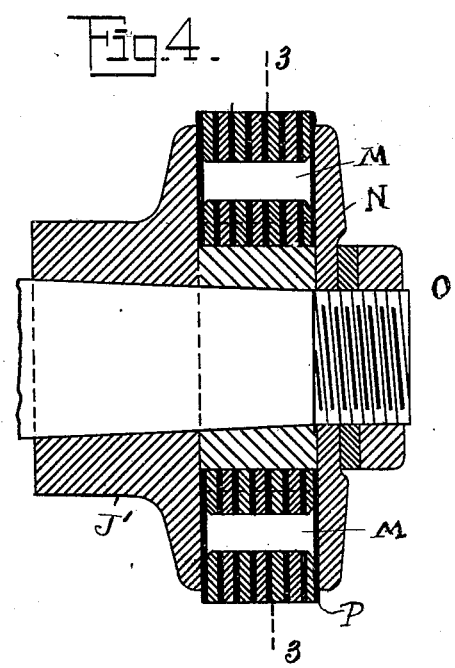

I show in Figs. 3 and 4 a slightly-modified form of my invention. The core K is made with a fluted periphery. The tire-sections L L are arranged to engage with the grooves in the periphery of the core, and are thus held in connection therewith. The tire-sections are secured by bolts M M passing through them, as already described. The tire-sections are also arranged to overlap each other, and when the roller is made up of a sufficient number of sections it is placed on the shaft J and held in position by the plate N and the nut O, or in any convenient manner. A cushioning substance P may be placed between the tire-sections or not, as desired.

What I claim as my invention, and desire to secure by Letters Patent, is—

1. A friction-roller, comprising a continuous and integral yielding core, a tire made up in sections whose inner edges rest on the periphery of the continuous core, means for securing said tire and said core together, with means for securing the tire-sections in position, substantially as described.

2. A friction-roller comprising a continuous yielding core, a tire composed of layers, each layer made up of a series of strips and each layer breaking joints with the layers next adjoining it, with a means for uniting the inner edges of each layer to the periphery of the core and means for securing the layers together, substantially as described.

3. A friction-roller, adapted for use in friction-driven trucks, comprising a yielding core, a tire made up of a series of layers, each layer composed of a series of sections, means for uniting the layers together, means for uniting the sections, with a yielding substance between adjacent layers, so arranged and connected up that the tire-sections will be driven toward each other in operation between the drive-wheels of a truck, substantially as described.

In witness whereof I have hereunto set my hand this 10th day of January, A. D. 1898.

JAMES F. McELROY.

Witnesses:
 W. W. EVANS,
 CHAS. B. MITCHELL.